(12) United States Patent
Durocher et al.

(10) Patent No.: US 12,071,252 B1
(45) Date of Patent: Aug. 27, 2024

(54) AIRCRAFT AND ASSOCIATED METHOD OF CONTROLLING AN ELECTRIC AIRCRAFT POWERPLANT

(71) Applicant: PRATT & WHITNEY CANADA CORP., Longueuil (CA)

(72) Inventors: Eric Sylvain Durocher, Boucherville (CA); Michel Labrecque, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/333,696

(22) Filed: Jun. 13, 2023

(51) Int. Cl.
| | |
|---|---|
| *B64C 11/30* | (2006.01) |
| *B64C 11/44* | (2006.01) |
| *B64D 27/24* | (2024.01) |

(52) U.S. Cl.
CPC ............ *B64D 27/24* (2013.01); *B64C 11/305* (2013.01); *B64C 11/44* (2013.01)

(58) Field of Classification Search
CPC ........ B64D 27/24; B64D 27/02; B64D 27/12; B64D 27/14; B64D 27/20; B64D 27/32; B64D 2221/00; B64D 31/00; B64C 11/44; B64C 11/305
See application file for complete search history.

(56) References Cited

U.S. PATENT DOCUMENTS

| | | | |
|---|---|---|---|
| 9,212,625 B2 | 12/2015 | Shelley | |
| 10,662,875 B2 | 5/2020 | Lafargue et al. | |
| 11,233,444 B2 | 1/2022 | Seminel | |
| 11,313,282 B2 | 4/2022 | Maljean | |
| 11,628,942 B2 | 4/2023 | LaTulipe | |
| 2007/0267540 A1* | 11/2007 | Atkey | B64D 41/00 244/58 |
| 2017/0260872 A1* | 9/2017 | Munevar | F01D 21/006 |
| 2020/0309027 A1* | 10/2020 | Rytkönen | F02C 6/20 |

* cited by examiner

*Primary Examiner* — Dapinder Singh
(74) *Attorney, Agent, or Firm* — Norton Rose Fulbright Canada LLP (57) ABSTRACT

The aircraft can include a rotary airfoil device having an output shaft rotatable around an airfoil rotation axis; an electric engine having a source shaft drivingly coupled to the output shaft; a controller in communication with the electric engine; a low voltage electric system operable to power the controller; a high voltage electric system having a high voltage battery operable to power the electric engine, the high voltage battery further operable to power the low voltage electric system via a voltage converter; and an electromagnetic generator having a generator shaft coupled to the output shaft, the electromagnetic generator operable to power the low voltage electric system.

20 Claims, 5 Drawing Sheets

AIRCRAFT AND ASSOCIATED METHOD OF CONTROLLING AN ELECTRIC AIRCRAFT POWERPLANT

TECHNICAL FIELD

The application relates generally to electric aircraft powerplants and, more particularly, to electric drivetrains and associated control systems.

BACKGROUND OF THE ART

Many aircrafts have control systems which can include one or more of an engine controller, a navigation subsystem, or a maneuver subsystem. Such aircrafts may need a main power source to power the control system, and an auxiliary power source to power the control system in the event of a failure of the main power source. While power systems were satisfactory to a certain degree, there always remains room for improvement. Indeed, various contextual elements may motivate aircraft engine designers to adapt existing solutions to new contexts, or to find new solutions, and the use of electric engines is relatively recent in the field of aircraft engines. Moreover, aircraft engine designers evolve in a complex environment where many factors are to be accounted for, such as volume, weight, costs (both initial and maintenance-related), assembly considerations, reliability, etc.

SUMMARY

In one aspect, there is provided an aircraft comprising: a rotary airfoil device having an output shaft rotatable around an airfoil rotation axis; an electric engine having a source shaft drivingly coupled to the output shaft; a controller in communication with the electric engine; a low voltage electric system operable to power the controller; a high voltage battery operable to power the electric engine, the high voltage battery further operable to power the low voltage electric system via a voltage converter; and an electromagnetic generator having a generator shaft coupled to the output shaft, the electromagnetic generator operable to power the low voltage electric system.

In another aspect, there is provided a method of controlling an aircraft powerplant having an electric engine coupled to an output shaft of a rotary airfoil device, an electromagnetic generator coupled to the output shaft, a high voltage battery and a controller, the method comprising: monitoring the aircraft powerplant during flight to determine whether a fault concerning at least one of the electric engine and the high voltage battery is occurring or not occurring; when the fault is not occurring, powering the controller via the high voltage battery; and when the fault is occurring, windmilling the rotary airfoil device and, via the electromagnetic generator, deriving mechanical energy from the windmilling of the rotary airfoil device, converting the mechanical energy to electric energy, and powering the controller.

DESCRIPTION OF THE DRAWINGS

Reference is now made to the accompanying figures in which.

DETAILED DESCRIPTION

Figure 1:
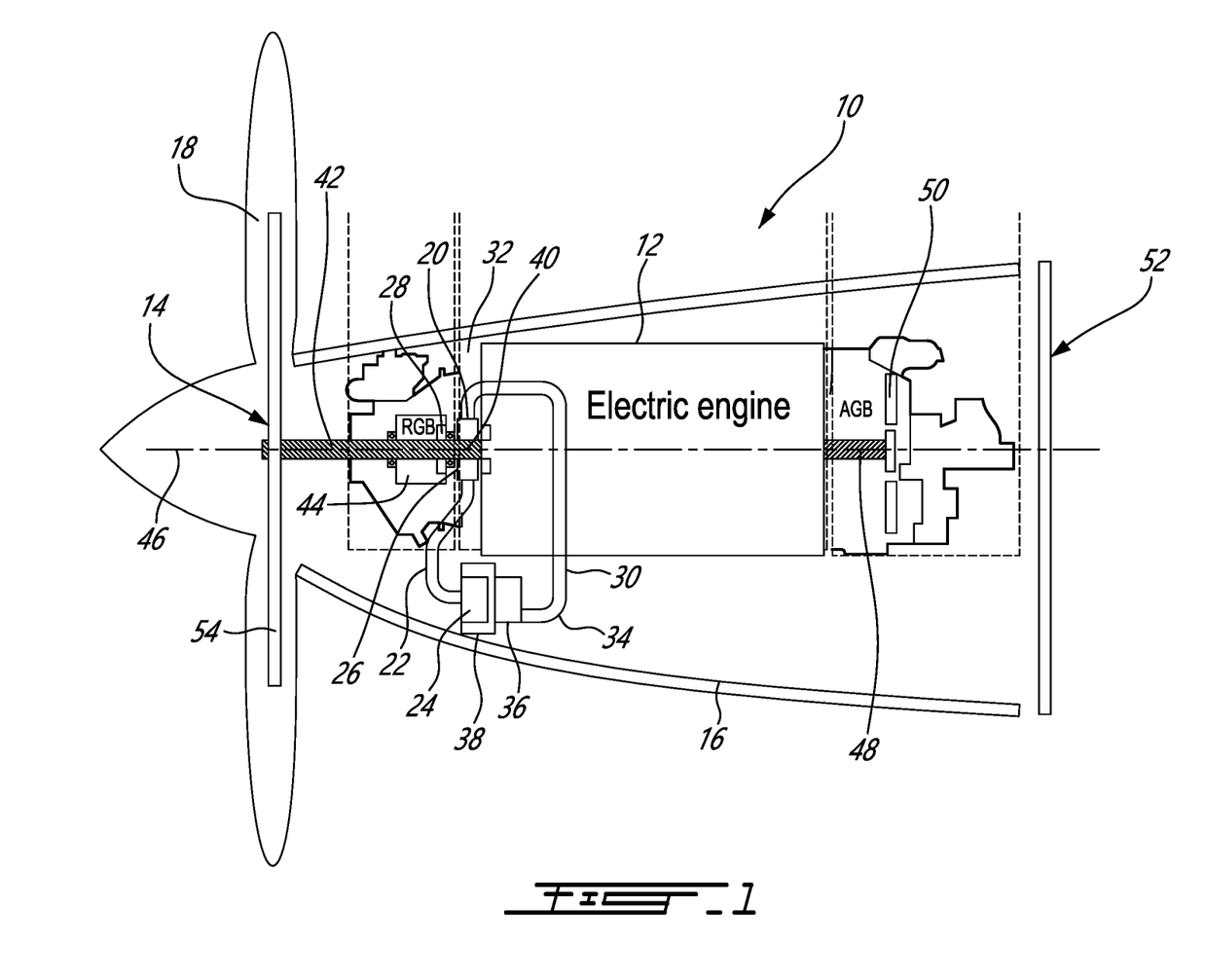
FIG. 1 is a schematic cross-sectional view of an example of an electric powerplant installation in an aircraft.

FIG. 1 illustrates an example electric aircraft powerplant 10 including an electric engine 12 drivingly coupled to a load, such a rotary airfoil device 14. In this example, the electric aircraft powerplant 10 is housed within a nose 16 of the aircraft and the rotary airfoil device 14 is provided in the form of a propeller 18, such as a variable-pitch propeller. In this example, the electric engine 12 has a first shaft which will be referred to here as a source shaft 40 and the rotary airfoil device 14 has an output shaft 42. The source shaft 40 is coupled to the output shaft 42 via a reduction gearbox (RGB) 44. In this example, the reduction gearbox 44 is an epicyclic gearing, and the source shaft 40 is rotatable around the same rotation axis 46 as the output shaft 42, in an in-line configuration. Moreover, the electric engine 12 also has a second shaft 48 coupled to an accessory gearbox (AGB) 50. Numerous variants are possible in different applications. For instance, in embodiments which are not shown, the reduction gearbox can have an offset configuration, with the source shaft and the output shaft parallel but offset rather than an in-line configuration. In an alternate embodiment, the rotary airfoil device 14 may be enclosed within a ducted structure in a fan configuration. Moreover, in the case of a helicopter application, the rotary airfoil device may include helicopter blades, and the output shaft may or may not be parallel to the source shaft.

Independently of the details of a given embodiment, bearing assemblies 20, such as ball bearings, may be used to provide smooth relative rotation between one or more of the shafts and non-rotating components such as a casing, and/or between two shafts which rotate at different speeds. An oil lubrication system 22 including an oil pump 24, sometimes referred to as a main pump, and a network of conduits and nozzles 26, can be provided to feed the bearings 20 with oil. Seals 28 can be used to contain the oil. A scavenge system 30 having cavities 32, conduits 34, and one or more scavenge pumps 36, can be used to recover the oil, which can be in the form of an oil foam at that stage, from the bearings 20. The oil pump 24 draws the oil from an oil reservoir 38. Air/oil separating devices (not shown) may be provided in the return line. Oil can also be supplied to lubricate gearing, such as a reduction gearbox 44 or accessory gearbox 50. Oil may be used not only for lubrication, but also for heat management, namely in cooling components which generate heat during operation.

Other types of engines may be used in aviation. For instance, aircraft hybrid powerplants comprising a combination of electric and heat engines or aircraft powerplants with a heat engine only are contemplated. There can be a motivation to retrofit an electric engine 12 to replace an existing, possibly ageing, heat engine in an aircraft. Either retrofitting an electric engine 12 to an existing aircraft, or designing an aircraft for receiving a new engine, may involve taking certain limitations into consideration. For example, in the example presented in FIG. 1, housing an engine 12 in an aircraft may be affected by engine installation constraints such as engine cowling of a narrow body shape (which may be tied to propeller thrust efficiency, pilot visibility, and aircraft performance-drag, for instance), the presence of a cabin firewall 52, or the propeller plane 54 axial position, which may impose particular limits in terms of dimensions or volume, in addition to other typical considerations in aviation such as cost (production and maintenance), weight, reliability, etc. In the case of retrofitting an electric engine 12 to a heat engine emplacement on an existing aircraft, additional challenges can exist in terms of finding ways to address other functionalities of the existing engine, such as driving accessories such as an oil pump 24, fuel-hydraulic actuators, heat exchangers, etc.

Figure 2:
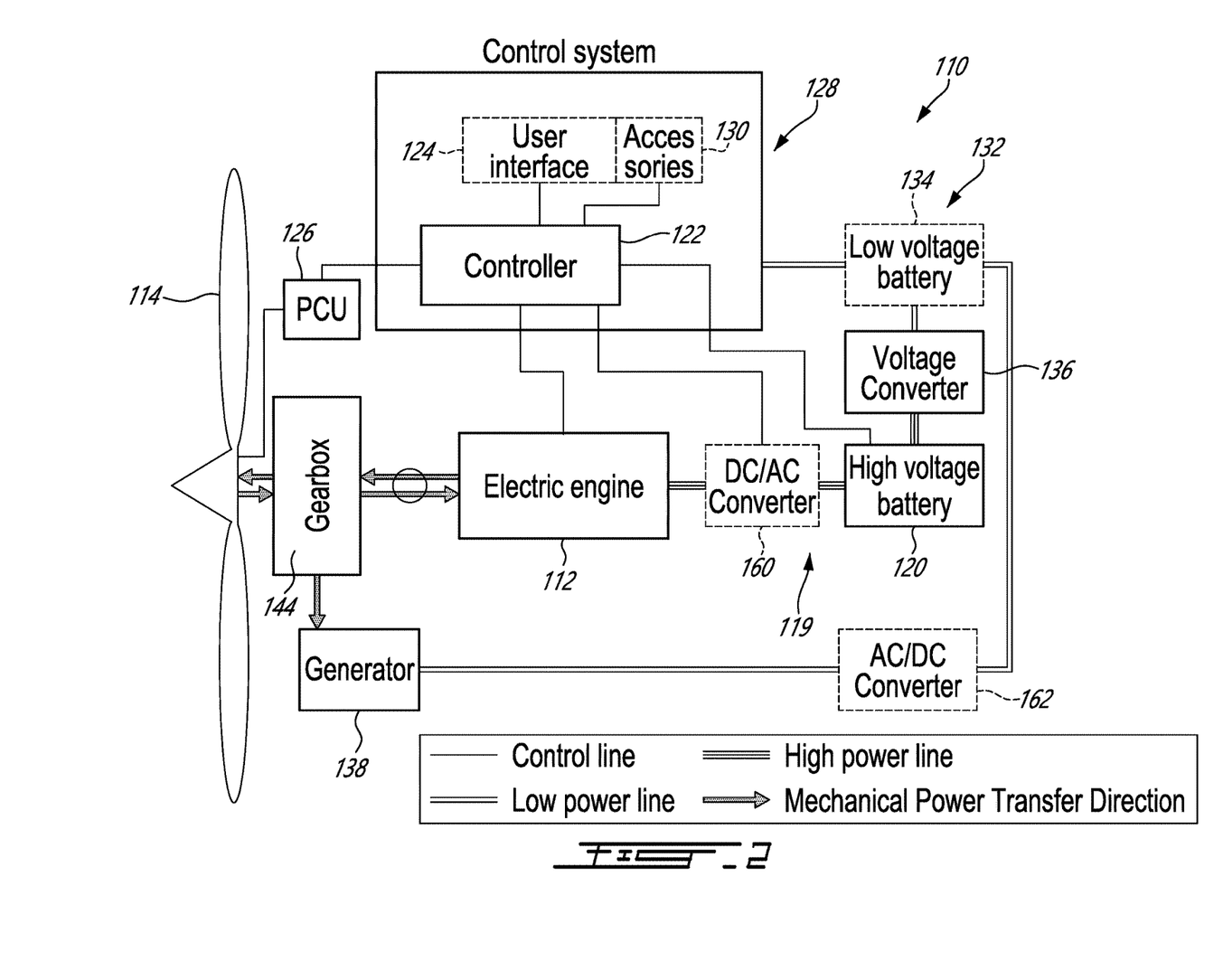
FIG. 2 is a schematic view of another example of an electric powerplant installation in an aircraft.

Turning now to FIG. 2, another example of an electric aircraft powerplant 110 is schematically presented. In this figure, emphasis is placed on the configuration of power transfer relationships and communication lines. At the mechanical level, an electric engine 112 is mechanically coupled to a rotary airfoil device 114. More specifically, the electric engine 112 can have a source shaft (not shown), the rotary airfoil device 114 can have an output shaft (not shown), and the source shaft can be coupled to the output shaft. A gearbox 144 is provided in this example. The gearbox 144 can include reduction gearing coupling the output shaft to the source shaft. In one embodiment, a torque transfer shaft (not shown) may couple the gearbox 144 to the output shaft.

A high voltage electric system 119 is provided with a high voltage battery 120. The electric engine 112 can operate in an engine mode in which it can convert the electrical energy from the high voltage battery 120 to mechanical energy over time, and can thus convert electrical power circulating in a transmission line extending between the high voltage battery 120 and the electric engine 112 to mechanical power in the shafts, gearbox 144, and rotary airfoil device 114, driving thrust. In one embodiment, the electric engine 112 can operate not only in an engine mode, but may also operate in generator mode. More specifically, in some situations, such as descent, the rotary airfoil device 114 may operate in windmilling rather than thrusting, and rather than imparting velocity to the surrounding air, operate in deriving energy from the relative velocity of the surrounding air. The windmilling can be driven by ram air. An intensity of the windmilling can be controlled by controlling the pitch of the blades and/or controlling a load. In this mode of operation, mechanical energy is conveyed, via rotation of the output shaft and of the source shaft, from the rotary airfoil device 114 to the electric engine 112, which can be operated in a way to convert this mechanical energy into electrical energy stored in the high voltage battery 120.

A controller 122 is provided to control the operation of the electric engine 112. This can involve controlling values of parameters of the electric engine directly, and/or receiving values of parameters from sensors associated to the electric engine 112, and in this sense, the controller 122 can communicate with the electric engine 112. The control of the electric engine 112 can also involve controlling or receiving sensor inputs from other elements of the electric aircraft powerplant 110, such as the high voltage battery 120 for instance. The control of the electric engine 112 can be based on further inputs, such as via communication with additional sensors (e.g. torque sensor, current sensor, shaft position sensor, temperature sensor—not shown) or a user interface 124 (e.g. thrust lever, aircraft control panel, etc.). The control of the electric engine 112 can involve controlling the power output (in engine mode) or the power input (in generator mode) of the electric engine 112. The control of the electric engine 112 can involve monitoring the operation of the electric aircraft powerplant 110 based on sensor input. The control of the electric engine 112 can involve determining whether a fault concerning one or more of the electric engine 112 and the high voltage battery 120 is occurring during flight. The control of the electric engine 112 can involve mechanically decoupling the source shaft from the output shaft if the fault is detected. The detection of the fault can be based on an excessive torque input, or on an excessive temperature input, to name two possible examples.

The controller 122 may also control the pitch of blades of the rotary airfoil device. A more aggressive pitch is typically referred to as "coarse" and is more typically used at higher speed, whereas a less aggressive pitch may be referred to as "fine" and is more typically used at takeoff or low speed. A pitch at which the rotary airfoil device 114 may rotate while generating no significant net thrust while the aircraft is immobile may be referred to as "disking", in which the chord of the blades extend parallel to the propeller plane 54, and is perhaps the finest pitch. A pitch referred to as feathering refers to bringing the chord of the blades close to parallel to the relative movement orientation of the ambient air, typically producing minimal drag in the event of a power failure. In one embodiment, a propeller control unit (PCU) 126 is provided which can mechanically control the pitch of blades of a rotary airfoil device 114 based on inputs from the controller 122. In some embodiments, a pitch sensor (not shown) can provide the controller 122 with a measurement of the pitch of the blades, and can be used by the controller 122. Various factors may guide the control of the pitch of the blades. For instance, the relative velocity between the ambient air and the aircraft, and the speed of rotation of the blades, may both affect which pitch angle will lead to the greatest amount of thrust. Moreover, in some situations, such as during descent, it may be desired to extract energy from the relative velocity of the surrounding air rather than impart energy for thrust. The amount of energy so extracted may also be affected by the pitch, in addition to the control parameters of the electric engine for instance.

The controller 122 can form part of a control system 128. The control system 128 may further include electric accessories 130, such as a navigation subsystem (not shown), or a maneuvering subsystem (not shown). The navigation subsystem can include sensors and user interface elements associated to the sensing and displaying of navigation parameters such as longitude, latitude, altitude. The maneuvering subsystem can include sensors and/or user interface elements associated to the maneuvering of the aircraft, such as control elements associated to the thrust, roll, yaw and/or pitch of the aircraft.

Still referring to FIG. 2, in this example, one or more elements of the control system 128, such as the controller 122 for example, is powered via a low voltage electric system 132. The low voltage electric system 132 operates at a voltage which is significantly lower than the high voltage electric system 119. The exact voltage of the low voltage electric system 132 can depend on parameters set by the aircraft manufacturer or the engine manufacturer. In some examples, the low voltage can be at or below 120V, such as 28V, 48V or 96V for instance. The exact voltage of the high voltage electric system 119 can depend on parameters set by the engine manufacturer or by the aircraft manufacturer. In some examples, the high voltage can be at or above 220V or 240V, such as at 600V, 800V or 1000V for instance. The low voltage electric system 132 may include wiring. The low voltage electric system 132 may include a low voltage battery 134. In the embodiment presented in FIG. 2, the high voltage battery 120 is operable to power the low voltage electric system 132. More specifically, a voltage converter 136 can be provided between the high voltage battery 120 and the low voltage electric system 132, to change the voltage of the electrical energy from the high voltage at which the electric engine 112 operates to the low voltage at which the one or more elements of the control system 128 operate. In such a configuration, it will be understood that a fault occurring in the high voltage electric system 119 may prevent the high voltage battery 120 from powering the low voltage electric system 132, and a fallback source of power may be desired.

In the example presented in FIG. 2, a fallback source of power is provided in the form of an electromagnetic generator 138, which may be referred to as an auxiliary generator. The electromagnetic generator 138 can be mechanically coupled to the output shaft of the rotary airfoil device 114. The electromagnetic generator 138 can be operable to derive mechanical power from windmilling of the rotary airfoil device 114, and to convert the derived mechanical power into electrical power, which can be used as a fallback, supplemental, or secondary source of electrical power for the low voltage electric system 132. The electromagnetic generator 138 can generate electricity at a low voltage, e.g. at or below 120V, suitable for the low voltage electric system 132.

Accordingly, during operation, the control system 128 may monitor the operation of the electric aircraft powerplant 110. When no fault is detected, or when it is otherwise deemed not desired to extract mechanical power with the electromagnetic generator 138, the low voltage electric system 132 may be powered by the high voltage battery 120. However, when a fault is detected, or when it is otherwise deemed desired to extract mechanical power with the electromagnetic generator 138, the electromagnetic generator 138 can be operated to solely power the low voltage electric system 132, or to supplement the power provided by the high voltage battery 120. Hence, in one embodiment, the electromagnetic generator 138 can be used as a fallback electrical power source to power the low voltage electric system 132 in the event of a fault which affects the capacity of the high voltage electric system 119 to power the low voltage electric system 132.

In one or more embodiments, if the controller 122 detects a fault concerning the electric engine 112 and/or the high voltage electric system 119 during flight, it may control the pitch of the blades of the rotary airfoil device to disking or near disking, and control the electromagnetic generator 138 to extract energy from the windmilling of the rotary airfoil device 114. In one embodiment, simultaneously, the controller 122 may control the electric engine 112 in a manner to limit any input or output of electrical energy into or out of the electric engine 112. For instance, in one embodiment, the controller 122 may mechanically decouple the electric engine 112 from the gearbox 144 or from a torque transfer shaft connecting the source shaft to reduction gearing (not shown).

In one or more embodiments, the electric engine 112 can be an alternative current (AC) electric engine, in which case the high voltage electric system 119 can include a DC to AC converter 160 may be used to convert direct current (DC) of the high voltage battery 120 into AC current at the electric engine 112. Similarly, if the electric aircraft powerplant 110 operates in generator mode, AC current generated at the electric engine 112 may be converted into DC current by a suitable converter. In one embodiment, the controller 122 can be used to monitor a fault which may affect the DC to AC converter 160, and may control the electromagnetic generator 138 to power the low voltage electric system 132 when the latter fault is detected. Various alternate embodiments are possible.

Similarly, in one or more embodiments, the electromagnetic generator 138 may be an AC generator, such as an alternator. In such an embodiment, an AC to DC converter 162 may be used to convert alternative current from the alternator into DC current in the low voltage electric system 132 (e.g. in the low voltage battery 134). Various alternate embodiments are possible.

In one or more embodiments, the electromagnetic generator 138 may have a generator shaft coupled to the output shaft within the gearbox 144. The generator shaft may rotate around an axis which is non-parallel to the rotation axis of the output shaft. For instance, a bevel gear (not shown) may be provided around the output shaft, and a bevel gear (not shown) of the output shaft may be meshed with the bevel gear of the output shaft. The gearbox 144 may have a housing and oil, or another lubricant, may circulate within the housing for lubrication and/or cooling.

In one or more embodiments, additional mechanically-powered accessories than the electromagnetic generator 138 may also have rotary shafts with bevel gears which are coupled to the bevel gear of the output shaft in the gearbox 144. Such additional accessories may include a propeller control unit 126 and/or an oil pump (not shown), for instance, or any other suitable additional units. The oil pump (not shown) may have the function of supplying pressure to oil or another lubricant which is circulated to lubricate and/or cool elements such as gearing and bearing assemblies, and/or to drive the operation of hydraulic actuators. Such additional accessories, and the generator shaft, may be distributed circumferentially around the output shaft. In one or more embodiments, such additional accessories may also be mechanically powered by windmilling of the rotary airfoil device in the event of a failure of the high voltage electric system 119 or electric engine 112. In an alternate embodiment, the gearbox 144 can include a plurality gears associated to parallel shafts to which different mechanically-powered accessories are coupled.

Figure 3:
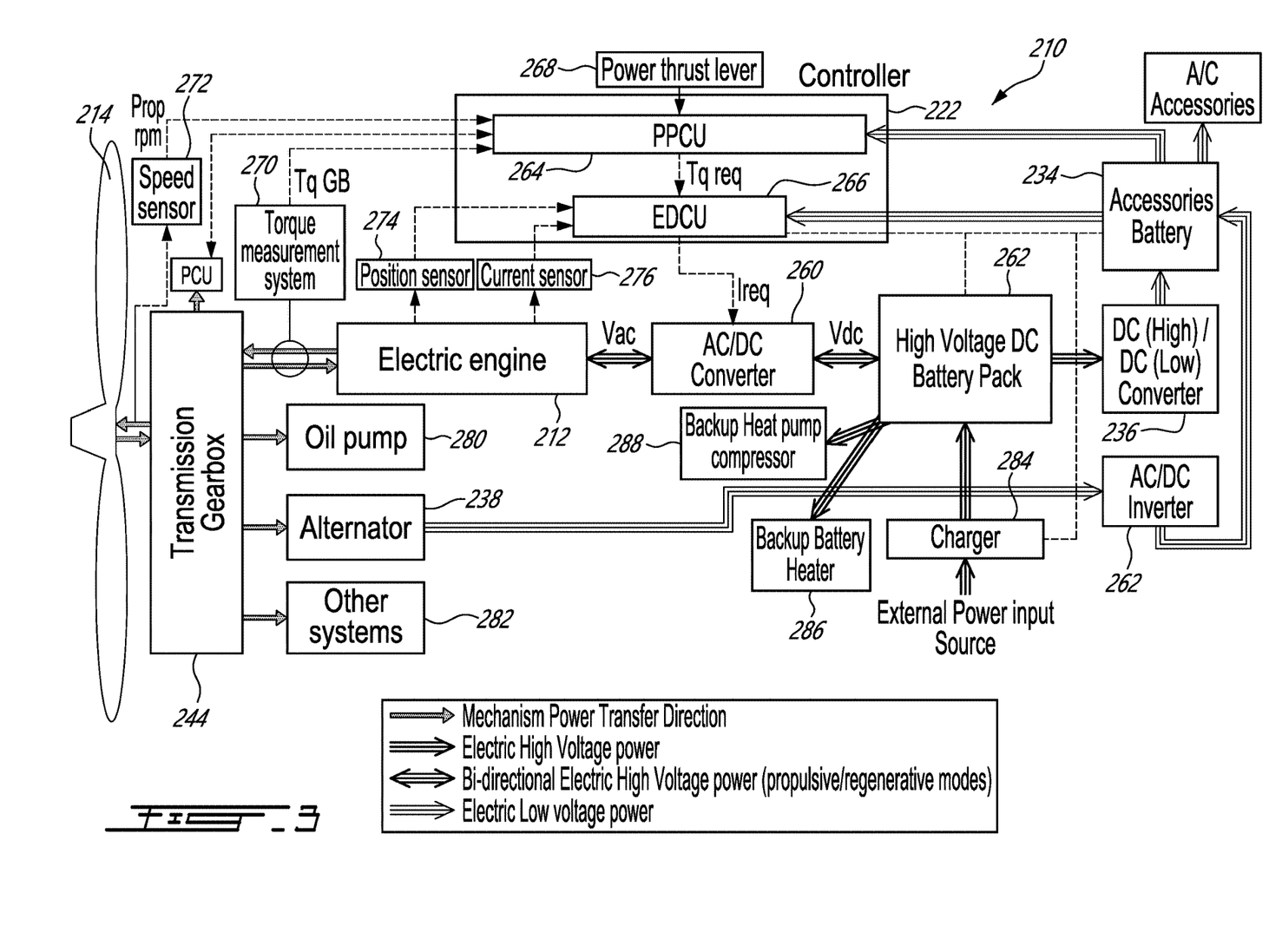
FIG. 3 is a schematic view of another example of an electric powerplant installation in an aircraft.

FIG. 3 presents an other example embodiment of an electric aircraft powerplant 210. In this example, the aircraft powerplant 210 includes a controller 222 which includes two controller units: a powertrain and propeller controller unit (PPCU) 264 and an electric drive controller unit (EDCU) 266. A power thrust lever 268 forming part of the user interface generates a thrust signal which is communicated to the powertrain and propeller controller unit 264. A torque measurement system 270 is provided and configured to measure the torque in the shaft(s) connecting the electric engine 212 to the propeller 214. The torque measurement system 270 generates a torque signal (TqGB) which is communicated to the powertrain and propeller controller unit 264. A pitch sensor (not shown) can provide a signal indicative of blade pitch. A speed sensor 272 is configured to measure the rotation speed of the output shaft or propeller 214, and to generate a speed signal (prop rpm) which is communicated to the powertrain and propeller controller unit 264. Based on the power thrust lever signal, the propeller speed signal, the torque signal, the powertrain and propeller controller unit 264 generates a requested torque signal which is communicated to the electric drive controller unit 266.

The powertrain and propeller controller unit 264 can receive signal of power thrust level position associated to a thrust required by an aircraft pilot. Based on sensor inputs coming from propeller speed, pitch position and torque measurement feedback, the powertrain and propeller controller can calculate the required torque and propeller pitch to obtain the power demand by adjusting propeller pitch via the PCU and by providing required current (Ireq) via the electric drive controller unit 266.

A position sensor 274 and a current sensor 276 are provided at the electric engine 212, and generate corresponding signals which are communicated to the electric drive controller unit 266. Based on the requested torque signal, the position signal and the current signal, the electric drive controller unit 266 generates a required current signal to an AC/DC converter 260, and thereby controls the flow of electrical power between the high voltage battery pack 262 and the electric engine 212. The position sensor 274 and current sensor 276 can be used to manage a tri-phase permanent magnet AC electric engine via the electric drive controller unit 266. A temperature sensor (not shown) can also used to monitor coolant temperature inside the electric engine 212.

A first indication of torque can be computed from the position sensor 274, which can provide a measurement of the RPM of the source shaft of the electric engine, and the current sensor, which can provide a measurement of the electrical current circulating in the electric engine 212. A second indication of torque can be acquired via the torque measurement system 270, which can be based on a variation in the circumferential distance between a reference feature on a reference shaft which is not subjected to the torque, and a reference feature on a torque shaft which is subjected to the torque (not shown). In an embodiment, the first indication can be a fallback to the second indication in one or more control process, or vice-versa. For instance, an indication of torque received from the torque measurement system 270 may be used to control the decoupling of the electric engine 212 from the rotary airfoil device, or an indication of torque received from the position signal and the current signal may be used to control the blade pitch. In another example, an indication of torque received from the torque measurement system 270 may be used together with a RPM reading from the position sensor 274 to calculate the total power.

In an embodiment, an indication of fault may be detected in case of failure of either the electric engine 212 or high voltage electric system (e.g. battery 262, AC/DC converter 260). A high voltage power system failure (e.g.: seizure of the electric engine 212) may be detected by via an over-torque measurement (e.g., a torque exceeding a given threshold value) from a torque sensor 270. Detecting a high voltage power system failure may lead to the controller 222 commanding the electric engine 212 to be mechanically dis-engaged from the geartrain 244, and the controller 222 putting the propeller pitch in position to keep propeller in motion (e.g.: feathering mode) to keep the geartrain 244 in rotation and provide power to the backup alternator unit 238. This alternator 238 can provide current to the aircraft emergency backup system. An AC/DC converter unit 260 can be located between an AC alternator 238 and the low voltage electric system (e.g. low voltage battery 234) to convert AC current to DC current.

In an embodiment an oil pump 280 and other mechanically powered systems 282 can also be coupled to the geartrain 244. The high voltage battery pack 262 can be configured to be charged from an external power input source via a charger 284. A backup battery heater 286 and a backup heat pump compressor 288 may also be powered by the high voltage DC battery pack 262.

Figure 4:
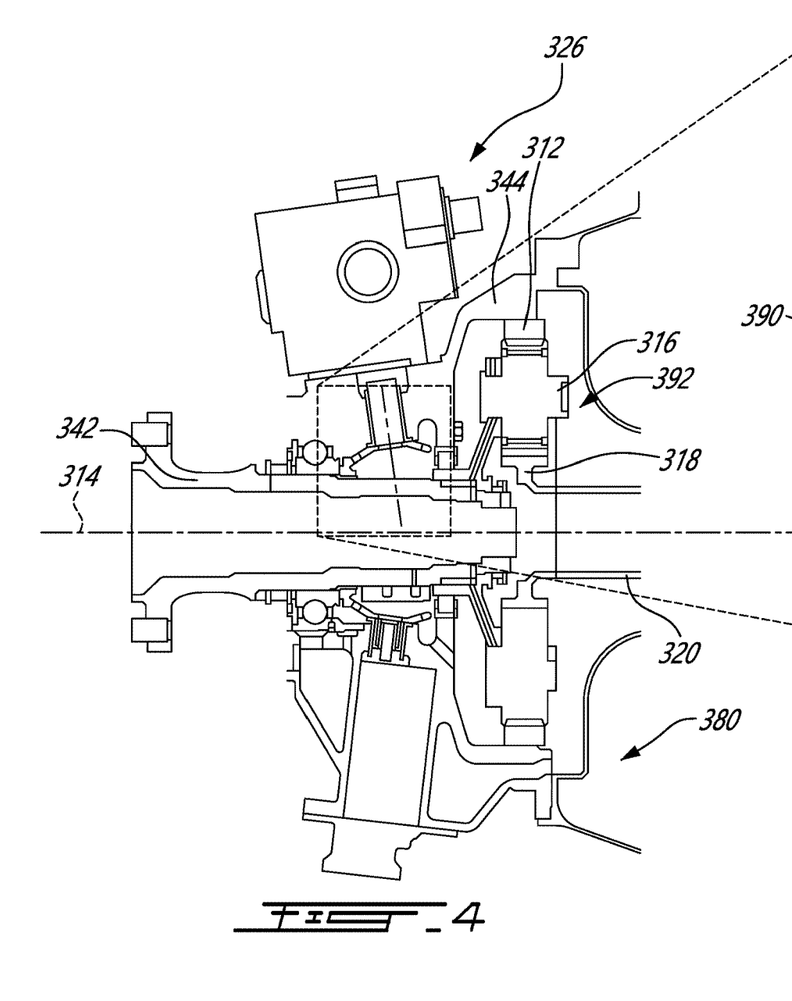
FIG. 4 is a cross-sectional view of an output shaft coupled to accessories and to a source shaft via gearing.
Figure 4A:
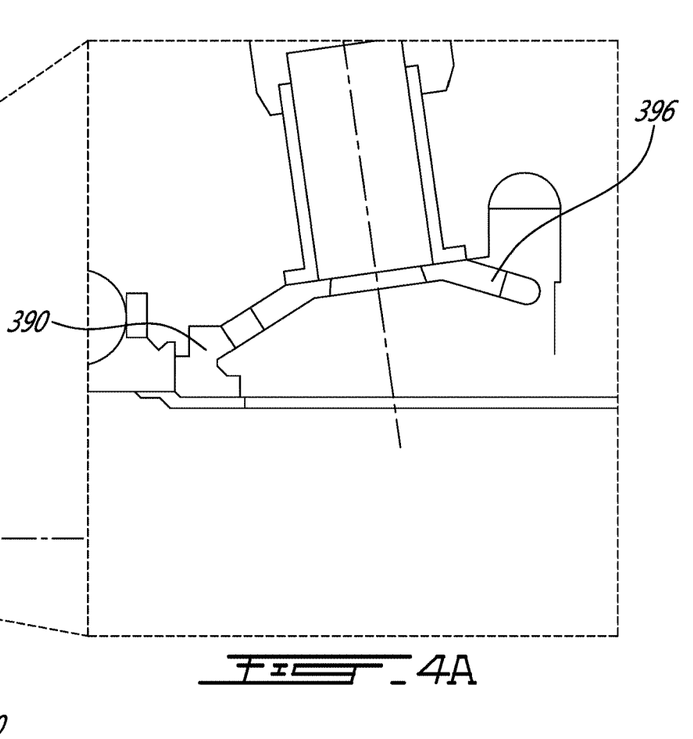

FIGS. 4 and 4A present an example embodiment where mechanically powered accessories 326, 380 are coupled to a bevel gear 390 of an output shaft 342 within a gearbox 344. More specifically, in this example, an oil pump 380 has a rotary shaft coupled to the bevel gear 390 of the output shaft 342 at a 6 O'clock position, and a propeller control unit 326 has a rotary shaft coupled to the bevel gear 390 of the output shaft 342 at a 12 O'Clock position. In this example, the reduction gearing is epicyclic gearing 392. It will be noted that an electromagnetic generator (not shown) can have a generator shaft coupled to the bevel gear 390 of the output shaft 342 at a 3 or 9 O'clock position, for example. The generator shaft can be rotatable around a generator rotation axis. The generator rotation axis can be non-parallel to the airfoil rotation axis 314. In this example, the oil pump 380 can supply pressurized oil to the propeller control unit 326.

FIG. 3A presents an enlarged view showing detail of how a shaft of a mechanically powered accessory such as a propeller control unit 326, an oil pump 380 or an electromagnetic generator can have a bevel gear 396 at its end and be engaged with a bevel gear 390 of the output shaft 342, in a manner for the shaft of the mechanically powered accessory to be non-parallel to the output shaft 342. Such a shaft configuration may be referred to as a tower shaft for example.

The epicyclic gearing 392 has a ring gear 312 coaxial to the airfoil rotation axis 314 and surrounding planetary gears 316, and a sun gear 318 coaxial to the airfoil rotation axis 314 and surrounded by the planetary gears 316. Each planetary gear 316 is meshed on the one hand with the sun gear 318, in the radially internal direction, and on the other hand with the ring gear 312, in the radially external direction. The planetary gears 316 can revolve around the axis 314 while remaining engaged with the sun gear 318 and the ring gear 312 and rotating around individual planet axes. The planet axes are offset from, but parallel to, the airfoil rotation axis 314. In this example, the sun gear 318 is integral to a torque shaft 320. When the engine operates in a manner to convey power to the output shaft 342, the power is transferred from the source shaft (not shown) to the output shaft 342 via the torque transfer shaft 320 and the epicyclic gearing 392. It will be understood that if the electric engine can operate in generator mode, the output shaft 342 can act as a power source when operating in the generator mode and the source shaft can act as an output shaft.

Figure 5:
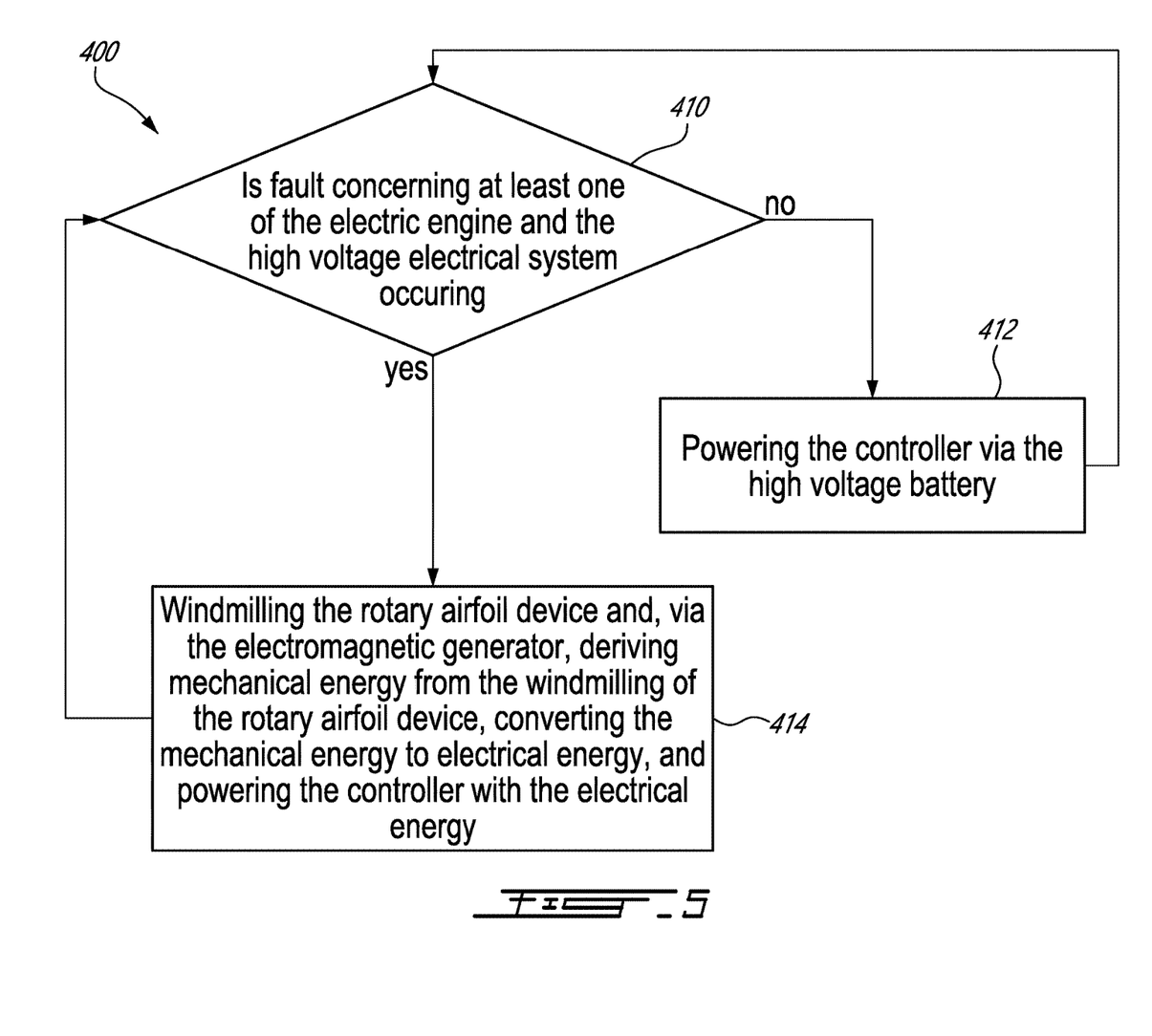
FIG. 5 is a flow chart of an example method of controlling an aircraft powerplant.

FIG. 5 presents an example method 400 of controlling an aircraft powerplant 10, 110 having an electric engine 112, 212 coupled to an output shaft 42, 342 of a rotary airfoil device 14, 114, 214, an electromagnetic generator 138 coupled to the output shaft 42, 342, a high voltage electric system 119 operable to power the electric engine 112, 212, and a controller 22, 122, 222. The method can include monitoring the aircraft powerplant 10, 110 during flight to determine 410 whether a fault concerning at least one of the electric engine 112, 212 and the high voltage electric system 119 is occurring or not occurring. When the fault is not occurring, the controller 22, 122, 222 can be powered 412 via the high voltage battery 162, 262. When the fault is occurring, the method can include windmilling 414 the rotary airfoil device 14, 114, 214 and, via the electromagnetic generator 138, deriving mechanical energy from the windmilling of the rotary airfoil device 14, 114, 214, converting the mechanical energy to electrical energy, and powering the controller 22, 122, 222 with the electrical energy. In the embodiment illustrated in FIG. 5, the controller 22, 122, 222 can resume the powering of the controller 22, 122, 222 via the high voltage battery 162, 262 when the fault is no longer detected. In an alternate embodiment, the electromagnetic generator 138 may also be used to power the low voltage electric system 132 when the fault is not determined to have occurred, such as when windmilling power is deemed available. In such an alternate embodiment, the controller 22, 122, 222 may stop powering the low voltage electric system 132 with the high voltage battery 162, 262 when using the electromagnetic generator 138, or may simultaneously use the electromagnetic generator 138 and the high voltage battery 162, 262 to power the low voltage electric system.

In an embodiment, the windmilling of the rotary airfoil device 14, 114, 214 can include controlling a pitch of blades of the rotary airfoil device 14, 114, 214 while the blades of the rotary airfoil device 14, 114, 214 are exposed to ram air. Controlling the pitch of blades of the rotary airfoil device 14, 114, 214 can include maintaining the blades at a feathering pitch. When the fault is occurring, the controller 22, 122, 222 may decouple the electric engine 112, 212 from the output shaft 42, 342. When the fault is occurring, the controller 22, 122, 222 can decouple the high voltage electric system 119 from the controller 22, 122, 222. Powering the controller 22, 122, 222 via the high voltage electric system 119 can include charging a low voltage battery 134, 234 with a high voltage battery 162, 262, via a voltage converter 136, 236, and powering the controller 22, 122, 222 with the low voltage battery 134, 234. Powering the controller 22, 122, 222 can include powering at least one of a maneuvering subsystem and a navigation subsystem forming part of a control system 128 with the controller 22, 122, 222. Monitoring the aircraft powerplant 10, 110, 210 can include monitoring values of sensed parameters, such as a torque measurement, a temperature measurement and/or an RPM, and comparing one or more values of sensed parameters to corresponding threshold values. For instance, a fault may be detected to have occurred when a torque measurement exceeds a torque threshold value, and/or when a temperature measurement exceeds a temperature threshold value, to name two possible examples.

It will be understood that the expression controller as used herein is not to be interpreted in a limiting manner. It is rather used in a broad sense to generally refer to the combination of some form of one or more processing units and some form of memory system accessible by the processing unit(s). The memory system can be of the non-transitory type. The use of the expression controller in its singular form as used herein includes within its scope one or more processing units working to perform a given function.

A processing unit can be embodied in the form of a general-purpose micro-processor or microcontroller, a digital signal processing (DSP) processor, an integrated circuit, a field programmable gate array (FPGA), a reconfigurable processor, a programmable read-only memory (PROM), an electronic engine controller EEC, a full authority digital engine controller (FADEC), to name a few examples.

The memory system can include a suitable combination of any suitable type of computer-readable memory located either internally, externally, and accessible by the processor in a wired or wireless manner, either directly or over a network such as the Internet. A computer-readable memory can be embodied in the form of random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) to name a few examples.

It will be understood that a controller can perform functions or processes via hardware or a combination of both hardware and software. For example, hardware can include logic gates included as part of a silicon chip of a processor. Software (e.g. application, process) can be in the form of data such as computer-readable instructions stored in a non-transitory computer-readable memory accessible by one or more processing units. With respect to a controller or a processing unit, the expression "configured to" relates to the presence of hardware or a combination of hardware and software which is operable to perform the associated functions.

The methods and systems for operating an electric aircraft powerplant described herein may be implemented in a high level procedural or object oriented programming or scripting language, or a combination thereof, to communicate with or assist in the operation of a computer system, for example the controller. Alternatively, the methods and systems for operating an electric aircraft powerplant may be implemented in assembly or machine language. The language may be a compiled or interpreted language. Program code for implementing the methods and systems for operating an electric aircraft powerplant may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an electric aircraft powerplant may also be considered to be implemented by way of a non-transitory computer-readable storage medium having a computer program stored thereon. The computer program may comprise computer-readable instructions which cause a controller, or more specifically a processing unit, to operate in a specific and predefined manner to perform the functions described herein, for example those described in the method 400.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft comprising:
 a rotary airfoil device having an output shaft rotatable around an airfoil rotation axis;
 an electric engine having a source shaft drivingly coupled to the output shaft;
 a controller in communication with the electric engine;
 a low voltage electric system operable to convey power to the controller;
 a high voltage electric system having a high voltage battery operable to power the electric engine, the high voltage battery further operable to power the low voltage electric system via a voltage converter; and an electromagnetic generator having a generator shaft coupled to the output shaft, the electromagnetic generator operable to power the low voltage electric system.

2. The aircraft of claim 1 wherein the controller is in communication with non-transitory memory storing instructions, which instructions when executed cause the controller to:
  detect a fault concerning at least one of the electric engine and the high voltage electric system during flight; and
  when detecting the fault, control a pitch of the rotary airfoil device and the electric engine to windmill the rotary airfoil device, and control the electromagnetic generator to derive power from the windmilling of the rotary airfoil device.

3. The aircraft of claim 2 wherein said control the pitch of the rotary airfoil includes controlling a propeller control unit.

4. The aircraft of claim 2 wherein said control the electric engine includes decoupling the source shaft from the output shaft.

5. The aircraft of claim 2 wherein the instructions when executed cause the controller to power the low voltage electric system via the high voltage battery when not detecting the fault.

6. The aircraft of claim 1 wherein the generator shaft is rotatable around a generator rotation axis, the generator rotation axis being non-parallel to the airfoil rotation axis and coupled to the output shaft via a bevel gear engagement.

7. The aircraft of claim 1 further comprising a gearbox including reduction gearing coupling the source shaft to the output shaft.

8. The aircraft of claim 7 wherein the generator shaft is coupled to the output shaft via the gearbox.

9. The aircraft of claim 1 wherein the low voltage electric system has a low voltage battery.

10. The aircraft of claim 1 wherein the aircraft further comprises a control system including at least one of maneuvering subsystem and of a navigation subsystem, the low voltage electric system operable to power the control system.

11. The aircraft of claim 1 wherein the rotary airfoil device is a variable pitch propeller, and the aircraft is an airplane.

12. A method of controlling an aircraft powerplant having an electric engine coupled to an output shaft of a rotary airfoil device, an electromagnetic generator coupled to the output shaft, a high voltage electric system operable to power the electric engine, and a controller, the method comprising:
  monitoring the aircraft powerplant during flight to determine whether a fault concerning at least one of the electric engine and the high voltage electric system is occurring or not occurring;
  when the fault is not occurring, powering the controller via the high voltage electric system; and
  when the fault is occurring, windmilling the rotary airfoil device and, via the electromagnetic generator, deriving mechanical energy from the windmilling of the rotary airfoil device, converting the mechanical energy to electrical energy, and powering the controller with the electrical energy.

13. The method of claim 12 wherein said windmilling the rotary airfoil device includes controlling a pitch of blades of the rotary airfoil device while the blades of the rotary airfoil device are exposed to ram air.

14. The method of claim 13 wherein said controlling the pitch of blades of the rotary airfoil device includes maintaining the blades at a feathering pitch.

15. The method of claim 12 further comprising, when the fault is occurring, decoupling the electric engine from the output shaft.

16. The method of claim 12 wherein the powering the controller via the high voltage electric system includes charging a low voltage battery with a high voltage battery, via a voltage converter, and powering the controller with the low voltage battery.

17. The method of claim 12 wherein said powering the controller further includes powering at least one of a maneuvering subsystem and a navigation subsystem.

18. The method of claim 12 further comprising, when the fault is occurring, decoupling the high voltage electric system from the controller.

19. The method of claim 12 wherein said monitoring includes comparing a torque measurement to a torque threshold value.

20. The method of claim 12 wherein said monitoring includes comparing a temperature measurement to a temperature threshold value.

* * * * *